(12) United States Patent
Lee

(10) Patent No.: US 9,529,978 B2
(45) Date of Patent: Dec. 27, 2016

(54) CLOUD E-DRM SYSTEM AND SERVICE METHOD THEREOF

(71) Applicant: Chung Jong Lee, Seoul (KR)

(72) Inventor: Chung Jong Lee, Seoul (KR)

(*) Notice: Subject to any disclaimer, the term of this patent is extended or adjusted under 35 U.S.C. 154(b) by 449 days.

(21) Appl. No.: 14/012,589

(22) Filed: Aug. 28, 2013

(65) Prior Publication Data

US 2015/0067893 A1 Mar. 5, 2015

(51) Int. Cl.
*G06F 3/00* (2006.01)
*G06F 21/10* (2013.01)

(52) U.S. Cl.
CPC .................... *G06F 21/10* (2013.01)

(58) Field of Classification Search
USPC ....... 726/4, 5, 7, 8, 9, 30; 382/100; 713/185
See application file for complete search history.

(56) References Cited

U.S. PATENT DOCUMENTS

| | | | | |
|---|---|---|---|---|
| 8,391,494 B1* | 3/2013 | Serenyi | ............... | H04L 63/0428 380/278 |
| 2010/0242106 A1* | 9/2010 | Harris | ............... | H04L 63/08 726/15 |
| 2011/0099608 A1* | 4/2011 | Queck | ............... | G06F 21/6209 726/4 |
| 2011/0185355 A1* | 7/2011 | Chawla | ............... | G06F 9/5077 718/1 |
| 2011/0209064 A1* | 8/2011 | Jorgensen | ............... | G06F 9/4445 715/733 |
| 2011/0277026 A1* | 11/2011 | Agarwal | ............... | G06F 21/41 726/8 |
| 2012/0063635 A1* | 3/2012 | Matsushita | ............... | G06T 1/0028 382/100 |
| 2012/0166558 A1* | 6/2012 | Kim | ............... | H04L 51/34 709/206 |
| 2013/0125225 A1* | 5/2013 | Candelore | ............... | G06F 21/445 726/7 |
| 2013/0144869 A1* | 6/2013 | Shalabi | ............... | G06F 17/211 707/722 |
| 2013/0212576 A1* | 8/2013 | Huang | ............... | G06F 9/45558 718/1 |
| 2013/0268767 A1* | 10/2013 | Schrecker | ............... | G06F 21/31 713/185 |
| 2013/0282798 A1* | 10/2013 | McCarthy | ............... | H04L 41/0806 709/203 |
| 2014/0080590 A1* | 3/2014 | Link | ............... | G07F 17/3255 463/27 |
| 2014/0101310 A1* | 4/2014 | Savage | ............... | H04W 4/003 709/224 |
| 2014/0165164 A1* | 6/2014 | Pizurica | ............... | H04L 67/36 726/5 |

(Continued)

*Primary Examiner* — Sayed Beheshti Shirazi
(74) *Attorney, Agent, or Firm* — Novick, Kim & Lee, PLLC; Jae Youn Kim

(57) ABSTRACT

A digital rights management system and a service method thereof, and an enterprise digital rights management (E-DRM) system for document security installed in a cloud system are provided. The present systems can be implemented to be used in a variety of environments without being affected by the type or environment of a user terminal using a method which allows the client to use a contents data through a virtual machine system, and the E-DRM system is configured to include a cloud system, a security system and a virtual machine system.

12 Claims, 6 Drawing Sheets

(56) References Cited

U.S. PATENT DOCUMENTS

| | | | |
|---|---|---|---|
| 2014/0282894 A1* | 9/2014 | Manton | H04L 63/102 726/4 |
| 2014/0344332 A1* | 11/2014 | Giebler | H04L 67/2823 709/203 |
| 2015/0013014 A1* | 1/2015 | Daniel | G06F 21/10 726/27 |
| 2015/0195284 A1* | 7/2015 | Manton | H04L 63/102 726/4 |

\* cited by examiner

CLOUD E-DRM SYSTEM AND SERVICE METHOD THEREOF

BACKGROUND OF THE INVENTION

Field of the Invention

The present invention relates to a digital rights management (DRM) system and a service method thereof, and more specifically, to a cloud enterprise digital rights management (E-DRM) system and a service method thereof, which configures an E-DRM system for document security as a cloud environment and provides a service thereof.

Background of the Related Art

With the popularization of the Internet and the advancement in information communication techniques, use of digital contents is generalized. By the nature of digital technology, the digital contents maintain a quality state the same as that of an original copy although they are indefinitely copied. In addition, information thereof is easy to change, and the digital contents may be rapidly distributed into a wide area through a high-speed network. Therefore, management of copyright on the digital contents is very important, and, for these reasons, a variety of digital contents protection techniques are released in relation to creating and manufacturing, storing and managing, and protecting and distributing the digital contents, and providing digital contents service. A representative digital contents protection technique includes copy protection, conditional access system (CAS), digital rights management (DRM) and the like. The copy protection technique for protecting illegal copy of digital contents transmitted between devices is disadvantageous in that the copy protection can be applied only within a limited scope and cannot control various sorts of rights, and the CAS for granting a right for receiving broadcasting contents only to permitted viewers is disadvantageous in that it may control only the right for receiving the broadcasting contents. Contrarily, the DRM which may control various kinds of rights and support various types of formats is recognized as being appropriate as a contents protection technique in a digital convergence environment.

The DRM is a technique and service for protecting the profits and rights of digital right holders, and although the DRM is once regarded as being limited only to multimedia contents such as images, music, videos, games and the like, all sorts of contents may be a target of the DRM, and recently, the DRM technique is used to protect even internal information of an enterprise.

In order to protect illegal use or copy of digital contents, infringement of copyright or the like committed by a third party, the DRM uses a method of distributing encrypted digital contents and granting a decoding right for using the contents when the contents are executed only to authorized users. A dedicated program for discriminatingly granting a right to read, copy, store, output or edit according to the privilege of a user is installed and used in a user PC as a plug-in program or in a separated installation method so that only authorized users may view the encrypted contents. In addition, the dedicated program installed in the user PC performs a control and management function for allowing only authorized users to use the contents after confirming the privilege of the users while communicating with a DRM server.

The DRM may be largely divided into a commercial DRM (C-DRM) for protecting commercial value of digital contents and an enterprise DRM (E-DRM) for protecting internal document resources of an enterprise, and although the C-DRM and the E-DRM may be regarded as being similar to each other from the viewpoint of privilege control, their implementation techniques and use environments are quite different from each other. That is, since usage of the C-DRM is for protecting commercial value of digital contents, the C-DRM is used to allow a permitted user to use the digital contents and to prevent the digital contents from being copied by controlling a multimedia player or a playback program which plays back videos, audios and the like. On the other hand, since the purpose of the E-DRM is to protect internal document resources of an enterprise, the E-DRM allows only an authorized user to access the internal document resources and is used to control information through the control of a document edit program. While the C-DRM is regarded as being important with the advancement in the digital contents industry, as the factors which threaten security also increase with the improvement of technical skills, the E-DRM for minimizing the damage and loss of intellectual properties incurred by unauthorized behaviors becomes more important.

Existing E-DRM security techniques use a method of relying on control of software installed in a client (user PC), and domestic or foreign DRM companies do not go beyond the limitation. That is, due to the factors such as limited resources of a user PC, unstable factors of software, OS version upgrade, incompatibility among devices and the like, there are a lot of problems such as difficulties in compatibility among different types of OSs or mobile devices, difference of performance according to the environment of a connecting user, occurrence of error in software, increase of factors threatening security accompanied by using Active-X, and the like. In addition, since the existing E-DRM security techniques are not standardized due to the competition of technical skills among the companies, products of the manufacturing companies are not compatible with one another, and thus a different program needs to be separately installed for each company. Therefore, performance of the user PC is lowered since the programs installed in the user PC collide and interfere with one another. In addition, since each of the programs provides a different user interface, users suffer from inconvenience and increased work load, and from the viewpoint of the enterprise, burdens such as cost and the like are increased.

Meanwhile, advancement in the network environment, including improvement of the Internet speed, changes computer systems and the methods using the computer systems. That is, one of the changes is the advent of clouding computing which integrates resources of computers existing at different physical locations and provides the integrated resources. The resources are integrated through a virtualization technique by using servers having powerful functions, which are connected through a network, or by remotely using software. The cloud computing includes a system cloud used for parallel distributed data processing using a plurality of systems connected through a network and a service cloud for performing an operation or control process by a central server in response to a request from a plurality of clients or sharing integrated data among a variety of devices. Through the cloud computing methods, users may use the cloud computing service through the Internet at any place only if they carry a terminal having an Internet connection function and basic operation functions.

SUMMARY OF THE INVENTION

An important aspect of the present invention is that the present inventors recognized certain drawbacks of the related art, as mentioned above. As a result, the present inventors provided a solution to such drawbacks, as follows.

Therefore, the present invention has been made in view of the above problems, and it is an object of the present invention to provide a cloud E-DRM system having a reinforced security function and a method thereof, which provide a unified user interface in a variety of environments without being affected by an OS, a terminal or a software environment of a user.

To accomplish the above object, a cloud E-DRM system according to the present invention includes: a cloud system in which an E-DRM solution is installed, for encrypting and storing a contents data or decrypting and providing the contents data if it is called; a security system having access right information of a user, for confirming whether or not a client requesting the contents data has a proper right and requesting the contents data from the cloud system; and a virtual machine system for receiving a request for the contents data from the client and transfers the request to the security system, and receiving the contents data from the security system and displaying the received contents data so that the client may view the contents data.

To accomplish the above object, a cloud E-DRM service method according to an embodiment of the present invention relates to a DRM service, including: a data request reception step of receiving a request for a contents data from a client and transferring information on the client and the request for the contents data to a security system, by a virtual machine system; a right confirmation step of confirming whether or not the client has a proper right on the contents data, by the security system; a data request step of requesting the contents data from the cloud server, by the security system, if it is determined that the client has a proper right; a contents return step of finding the contents data from a storage device, encrypting the contents data and returning the contents data to the security system or the virtual machine system, by the cloud server; an image configuration step of configuring an image using the returned contents data, by the virtual machine system; and a client response step of providing the client with the configured image, by the virtual machine system.

To accomplish the above object, a cloud E-DRM service method according to another embodiment of the present invention relates to a DRM service, including: a data output request reception step of receiving a request for outputting a contents data from a client and transferring information on the client and the request for outputting the contents data to a security system, by a virtual machine system; a right confirmation step of confirming whether or not the client has a proper right for outputting the contents data, by the security system; a data request step of requesting the contents data from the cloud server, by the security system, if it is determined that the client has a proper right; a contents return step of finding the contents data from a storage device, encrypting the contents data and returning the contents data to the security system, by the cloud server; an output data configuration step of configuring an output data including at least one or more of the contents data, the output request client and an output date in the returned contents data in a form of a barcode or a watermark, by the security system; and an output step of outputting the configured output data through a printing device.

To accomplish the above object, a cloud E-DRM service method according to still another embodiment of the present invention relates to a DRM service, including: a data provide request reception step of receiving a request for providing a contents data to outside of a network from a client and transferring information on the client and the request for providing the contents data to outside of the network to a security system, by a virtual machine system; a right confirmation step of confirming whether or not the client has a proper right for providing the contents data to outside, by the security system; a data request step of requesting the contents data from the cloud server, by the security system, if it is determined that the client has a proper right; a contents return step of finding the contents data from a storage device, encrypting the contents data and returning the contents data to the security system, by the cloud server; an e-mail creation step of creating an e-mail including a link to the returned contents data, by the security system; and an e-mail transmission and confirmation step of transmitting the created e-mail to the client or an address of a destination requested by the client and confirming the contents data using the link included in the e-mail.

The additional features and advantages of the present invention will be described in the following descriptions and partially clarified by the above descriptions or fully informed through the execution of the present invention. The objects and other advantages of the present invention will be implemented particularly by the structure specified in the claims, as well as the following descriptions and attached drawings.

| BRIEF DESCRIPTION OF THE DRAWINGS | |
|---|---|
| 100: Client | 110: Internal client |
| 120: External client | 200: Virtual machine system |
| 210: Virtual server | |
| 220: Device-type-specific server | |
| 230: Isolation server (or compartment server) | |
| 300: Security system | 310: Authentication server |
| 320: Policy server | 330: Security server |
| 400: Cloud system | 410: Cloud server |
| 420: Encryption and decryption server | |
| 430: DRM data storage device | |

DETAILED DESCRIPTION OF THE PREFERRED EMBODIMENT

In order to provide an E-DRM system and a service method thereof that can be used in a variety of environments without being affected by the type or environment of a user terminal, the present invention uses a method of installing an E-DRM solution in a cloud system and allowing a client to use contents data through a virtual machine system, by applying a cloud technique which allows high-efficiency service to be used using a plurality of systems connected through a network.

Hereinafter, the present invention will be described in detail with reference to the accompanying drawings.

Figure 1:
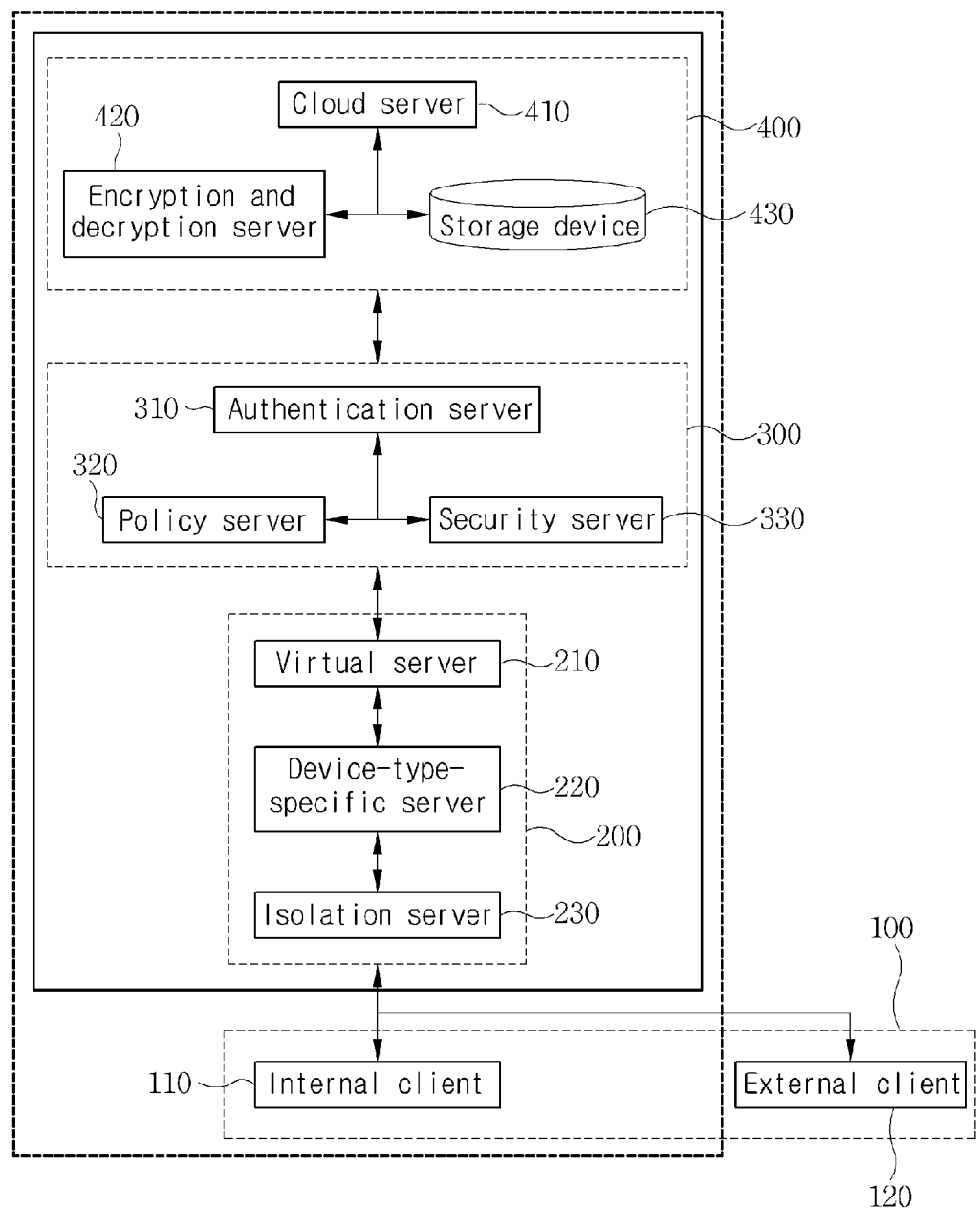
FIG. 1 is a block diagram showing the configuration of a cloud E-DRM system according to the present invention.

FIG. 1 is a block diagram showing the configuration of a cloud E-DRM system according to the present invention.

The configuration of the E-DRM system according to the present invention largely includes a client 100 using the E-DRM system, a virtual machine system 200 for receiving a request for a contents data from the client 100 and providing a result of processing the request, a security system 300 for confirming whether or not the client requesting the contents data has a proper right on the corresponding contents and managing the right, and a cloud system 400 in which an E-DRM solution is installed, for encrypting and storing the contents data.

The client 100 can be any kind of terminal device that can connect to a server through a network and use a data stored in the server, for example, a general PC or a mobile device such as a smart phone or a smart pad, and the PC may be one of products which use a variety of OSs and use environments, such as Linux and Mac products of Apple, as well as the Windows OS environment of the Microsoft. By the nature of the DRM solution which is not standardized, it is almost impossible, in an existing method, to use a DRM contents data in a use environment other than a PC of Windows family, whereas since the cloud E-DRM system according to the present invention is almost unaffected by the client environment, various types of clients including a mobile terminal may use the E-DRM system.

Although it is general that the client 100 is an internal client 110 placed in a network the same as that of the E-DRM system by the nature of the E-DRM aiming at security of internal documents or the like, the client 100 can be an external client 120 placed in an external network depending on a service method. The external client 120 can be relatively restricted in the scope of using contents data compared with the internal client 110 due to the reasons of security and may need a separate security apparatus.

The virtual machine system 200 functions as a passage facing the client 100 in the cloud E-DRM system according to the present invention and largely includes a virtual server 210 and a device-type-specific server 220. The virtual server 210 has a screen display function, accepts a display request from the device-type-specific server 220 and transfers the display request to the security system 300. If a DRM contents data is received, the virtual server 210 transmits the DRM contents data to the device-type-specific server 220 so that the contents data may be displayed on the screen of the client which has requested the contents data. That is, this is a method in which the virtual machine system 200 functions as a client in an existing DRM system and provides only a result screen to the client 100 which has requested the contents data. The device-type-specific server 220 allows clients of a variety of environments to use the cloud E-DRM system according to the present invention and may be configured of systems having diverse OSs. This is to provide the client 100 with the DRM contents data provided through the virtual server 210 in a state optimized to the use environment of each client 100 and to make it easy to confirm whether or not the client 100 has a proper right, and if the DRM contents data is provided to the client 100 using a standardized format such as a web or the like, the configuration of the device-type-specific server 220 may be simplified. Although the client 100 may directly connect to the device-type-specific server 220 of the virtual machine system 200, it is possible to provide a separate isolation server 230 (or compartment server 230) to connect the client 100 to the device-type-specific server 220 through the isolation server 230 in order to increase security, or it is possible for the client 100 to exchange a data with the virtual server 210 through the isolation server 230 after connecting to the device-type-specific server 220. If the isolation server 230 is used, the system can be prevented from being continuously connected to the client 100 and exposed to outside while performing a task such as verification of a right, and thus security of the internal data and the system may be enhanced. In addition, security of the contents data may be enhanced by encrypting a screen data corresponding to the contents data provided to the client 100 using a one-time key or by providing the screen data through a secure communication.

The security system 300 includes an authentication server 310 for confirming the client 100 and a policy server 320 for storing policies on the right to access the contents data. When a new contents data is received, the security system 300 sets information on the creator of the data and a policy on the right for viewing the new contents data and stores them in the cloud system 400. If a request of the client 100 for viewing the contents data is transferred through the virtual machine system 200, the security system 300 confirms whether or not the client has a proper right on the requested contents data, and if the right is confirmed, the security system 300 transfers the request to the cloud system 400. When the client 100 connects to the virtual machine system 200 in order to use the cloud E-DRM system, the client 100 may be identified based on the information such as an ID and a password, a private key, a connecting IP address, location information, a MAC address of the client system, cookies and the like. The authentication server 310 of the security system 300 identifies the corresponding client using the identification information of the client 100 received from the virtual server 210 and determines whether or not to authorize the client 100 by confirming whether or not the client has a proper right on the requested contents data based on the data of the policy server 320. If the client does not have a right on the requested contents data as a result of the authorization, the security system 300 transmits an authorization failure signal to the virtual machine system 200 to display that the client 100 cannot view the requested contents data, and the process is terminated. If it is confirmed that the client has a proper right as a result of the authorization, the security system 300 requests the corresponding contents data from the cloud system 400. Although the contents data may be directly transmitted from the cloud system 400 to the virtual machine system 200, since the contents data requires security, it is preferable to transmit the contents data to the virtual machine system 200 by way of the security system 300, and damage of the original data may be prevented by creating and providing a copy data, rather than providing the original data. In addition, the security system 300 also has a separate security server 330, and when the client requests to output the contents data or transmit the contents data to outside, the security server 330 may control the system to output or transmit the contents data if the client has a right for outputting the contents data or transmitting the contents data to outside. In the case of outputting a DRM contents data, it is preferable to manage output materials by inserting information on the corresponding DRM, the output date, the output client and the like in the form of a barcode or a watermark. In the case of a contents data transmitted to outside, it is preferable to provide only a link to the contents data in the form of an e-mail or the like and allow the client 100 to confirm the contents data as many as a predetermined number of times through the corresponding link when the client 100 is confirmed through a password or a certificate.

The cloud system 400 may include a cloud server 410 in which an E-DRM solution is installed, an encryption and decryption server 420 for processing encryption and decryption on a stored contents data, and a DRM data storage device 430. The cloud system 400 performs a function of processing encryption and protecting copyright on an input contents data and stores the contents data in a DRM data storage device 430, and a function of decrypting the stored contents data and providing the decrypted contents data to the client through the virtual machine system 200 in response to a request for contents data authorized by the security system 300. At this point, the process of encrypting or decrypting the contents data and storing the contents data is preferably performed in a parallel distributed manner according a method of configuring and processing a cloud of the cloud system so that a large amount of data may be processed in a speedy way. Here, the algorithm used for encrypting and decrypting the contents data is not limited, and it is preferable to use a method of an operation level appropriate to the processed data so as to maximize performance of the system while having security of a high level. In addition, when there are a lot of data required to be processed further rapidly, it is preferable to configure the encryption and decryption system 420 as a plurality of systems to process the data in parallel or use a dedicated hardware system.

Contrary to a method of installing an existing DRM solution in the client 100 and using a downloaded contents data after acquiring authorization, the present invention is different in that the E-DRM solution is installed in the cloud server 410, and the client 100 is provided with only a result screen after a contents data is decrypted in response to a request for contents data for which a right is confirmed by the security system 300. Since the client 100 does not need to independently install a DRM program performing a function of downloading a contents data and decrypting the contents data after authorizing the right on the contents data, a storage device of high performance or a large capacity is not needed, and the contents data can be used through various types of terminals. Since the cloud system 400 also includes a function of encrypting and storing the contents data, it may perform the function of a DRM server of an existing DRM system and also apply parallel distributed processing using a system configured as a cloud, and thus the contents data may be processed rapidly and efficiently.

The cloud E-DRM system according to the present invention may store log records of processing details of all the virtual machine system 200, the security system 300 and the cloud system 400 and, particularly, may store a DRM request and a result of processing the request in the cloud system 400 so that the log records may be controlled in a centralized manner.

Figure 2:
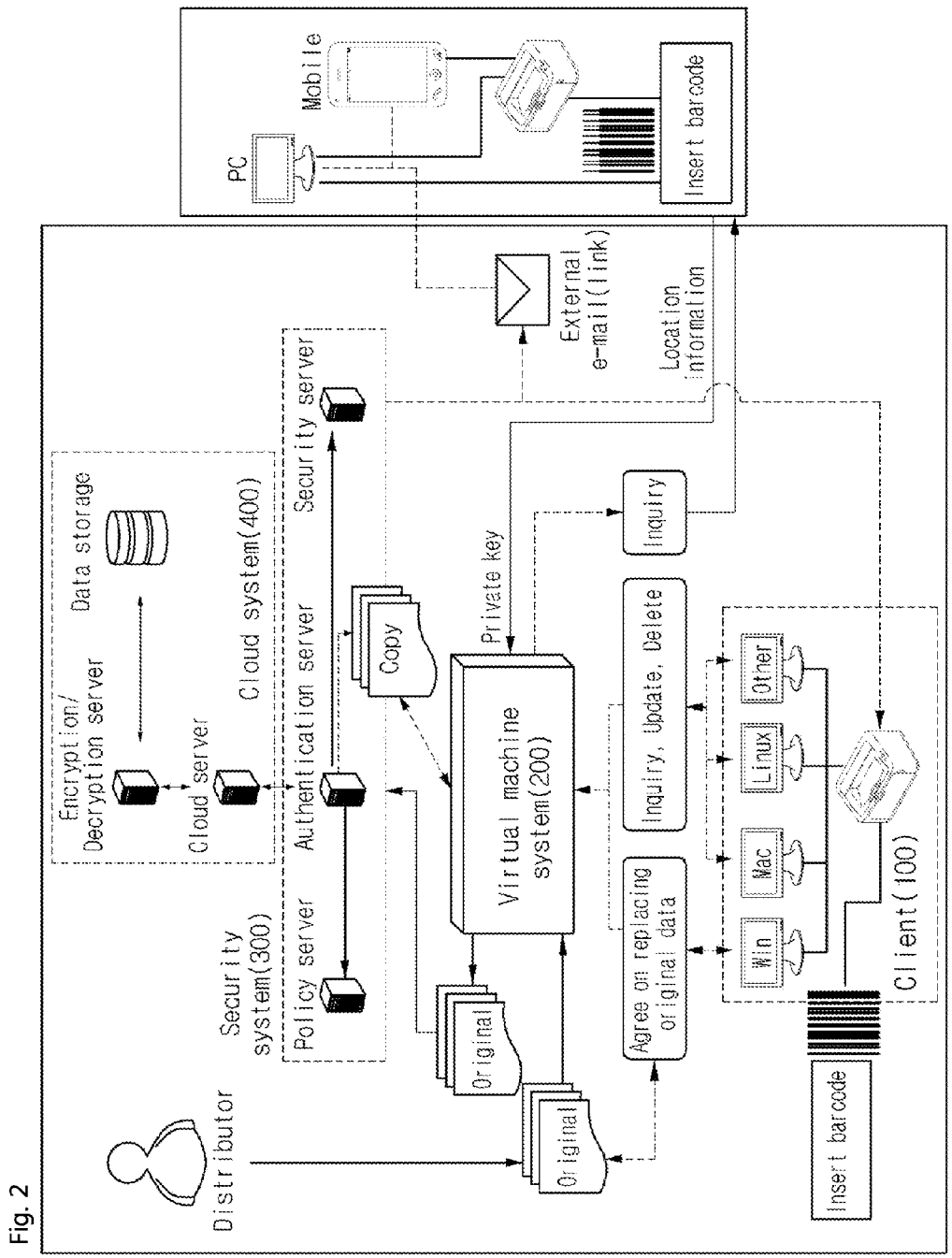
FIG. 2 is a view showing data flow of a cloud E-DRM system according to the present invention.

FIG. 2 is a view showing data flow of a cloud E-DRM system according to the present invention.

The internal client 110 placed within a network may be a terminal device using any one of a variety of OSs such as Windows, Mac OS, Linux and the like, and requests and performs a task such as inquiring or updating a contents data, whereas although the external client 120 placed in an external network may be any one of a variety of terminal devices including even a mobile device, as well as a general PC, like the internal client 110, the external client 120 may additionally request location information or a personal key in order to authenticate the client, and it is preferable from the viewpoint of security that the external client is allowed only to inquire contents data, unlike the internal client 110. In addition, security of the system may be enhanced by connecting the client 100 to the cloud E-DRM system of the present invention by way of the isolation server 230 when the client 100 connects to the cloud E-DRM system through the virtual machine system 200.

If a contents distributor positioned in the internal network requests to input contents through the virtual machine system 200, the security system 300 confirms and stores information on the distributor and the policy on the right for inquiring the contents data and directs the cloud system 400 to store the contents data. Then, the cloud system 400 accumulates the contents data in a method of storing the inputted contents data after encryption. When the client desires to update a previously stored contents data, it is preferable to update the contents data after making an agreement on the updated contents with the contents distributor.

When a request for a contents data is received from the client 100, the virtual machine system 200 transmits a variety of identification information of the client 100 such as an ID, an IP address, location information, a MAC address, cookies and the like to the security system 300, together with information on the request, and the security system 300 identifies the client 100 based on the transferred information and determines whether or not to approve the request by confirming whether or not the client 100 has a proper right on the corresponding contents data. If the request is approved by confirming the right, the security system 300 requests and receives the contents data from the cloud system 400 and allows the client 100 to use the requested contents data through the virtual machine system 200. It is preferable to create and provide a copy of the contents data to prevent the original data from being damaged if ever. If the client 100 requests to output the contents data or to transmit the contents data to outside, output or transmission of the contents data is controlled through an additional security server 330. In the case of outputting a DRM contents data, it is preferable to manage output materials by inserting information on the corresponding DRM, the output date, the output client and the like in the form of a barcode or a watermark. In the case of a contents data transmitted to outside, it is preferable to provide only a link to the contents data in the form of an e-mail or the like and allow the client 100 to confirm the contents data as many as a predetermined number of times through the corresponding link when the client 100 is confirmed through a password or a certificate.

Figure 3:
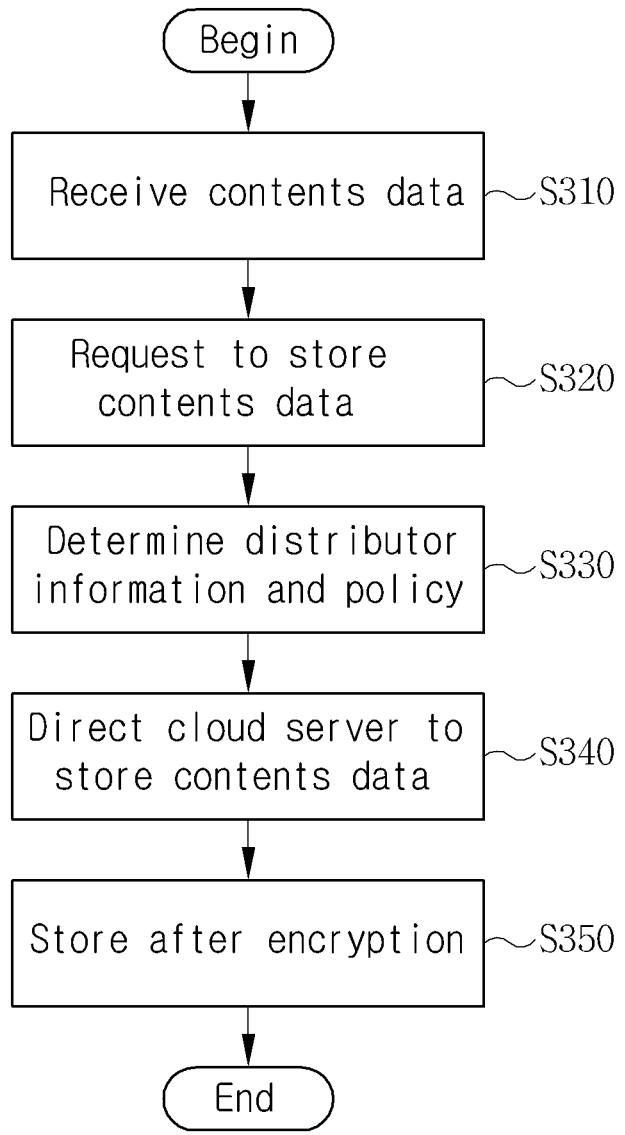
FIG. 3 is a flowchart illustrating a procedure of storing a new contents data according to the present invention.

FIG. 3 is a flowchart illustrating a procedure of storing a new contents data according to the present invention.

If a contents distributor positioned in the internal network requests to input contents, the virtual machine system 200 receives a contents data S310 and requests the security system 300 and the cloud system 400 to store the contents data S320 as shown in FIG. 3. The security system 300 confirms and stores information on the distributor and the policy on the right for inquiring the contents data S330 and directs the cloud system 400 to store the contents data S340. Then, the cloud system 400 accumulates the contents data in a method of storing the inputted contents data S350 after encryption. When the client desires to update a previously stored contents data, it is preferable to update the contents data after making an agreement on the updated contents with the contents distributor.

Figure 4:
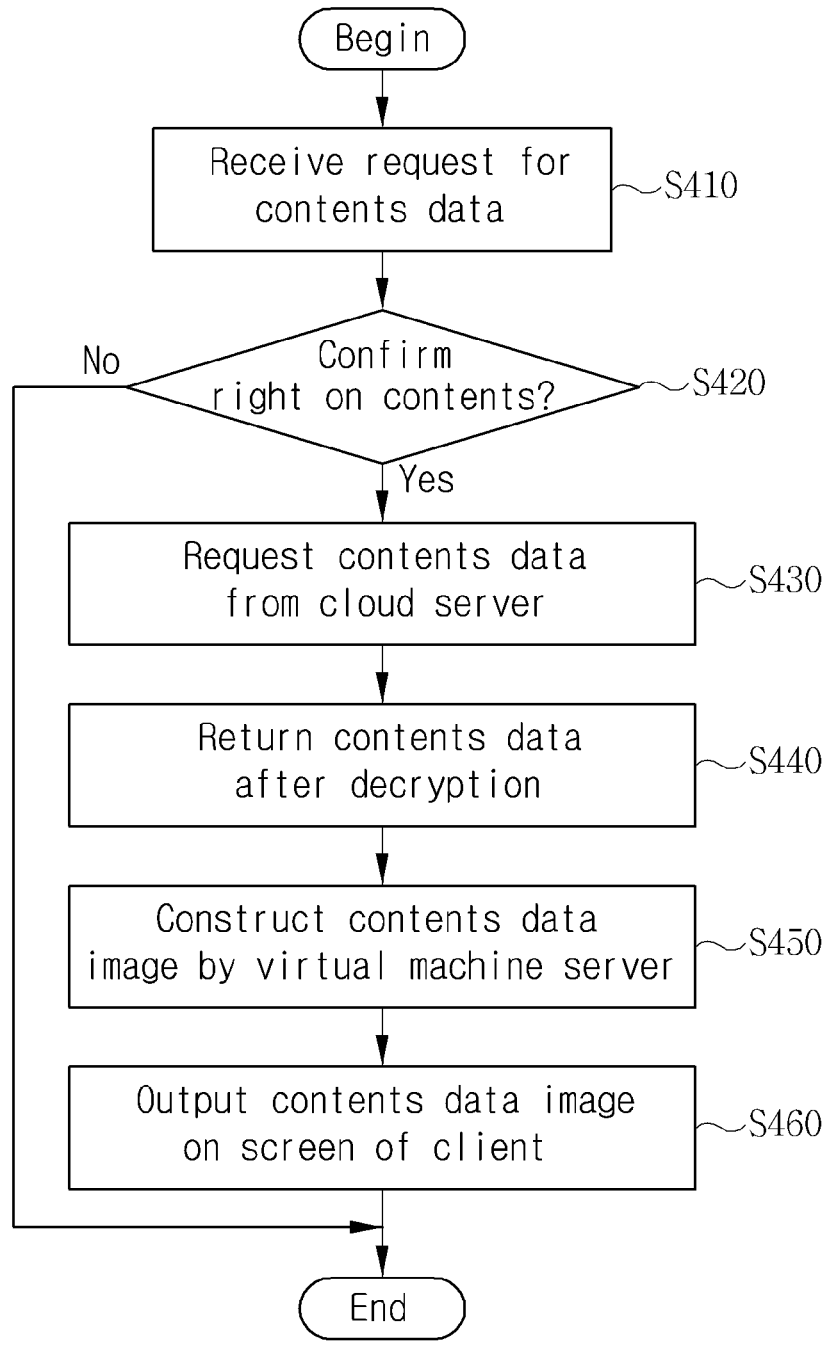
FIG. 4 is a flowchart illustrating a procedure of providing a contents data in response to a request of a client according to the present invention.

FIG. 4 is a flowchart illustrating a procedure of providing a contents data in response to a request of a client according to the present invention.

As shown in FIG. 4, when a request for a contents data is received from the client 100 S410, the virtual machine system 200 transmits a variety of identification information of the client 100 such as an ID, an IP address, location information, a MAC address, cookies and the like to the security system 300, together with information on the request, and the security system 300 identifies the client 100 based on the transferred information and determines whether or not to approve the request by confirming whether or not the client 100 has a proper right on the corresponding contents data S420. If the request is approved by confirming the right, the security system 300 requests the contents data from the cloud system 400 S430. If the cloud system 400 finds a corresponding contents data from the DRM data storage device 430 and returns the contents data after decrypting the contents data through the encryption and decryption server 420 S440, the security system 300 receives and transmits the contents data to the virtual machine system 200. At this point, although the contents data may be directly transmitted from the cloud system 400 to the virtual machine system 200, it is preferable to transfer the contents data to the virtual machine system 200 by way of the security system 300 to improve security and provide convenience of control, and since a copy of the contents data is created and provided, the original data may be prevented from being damaged if ever. The virtual server 210 of the virtual machine system 200 configures an image data in order to provide the transferred contents data to the client 100 S450 and transmits the image data to the device-type-specific server 220, and an image of the contents data is output on the screen of the client 100 S460.

Figure 5:
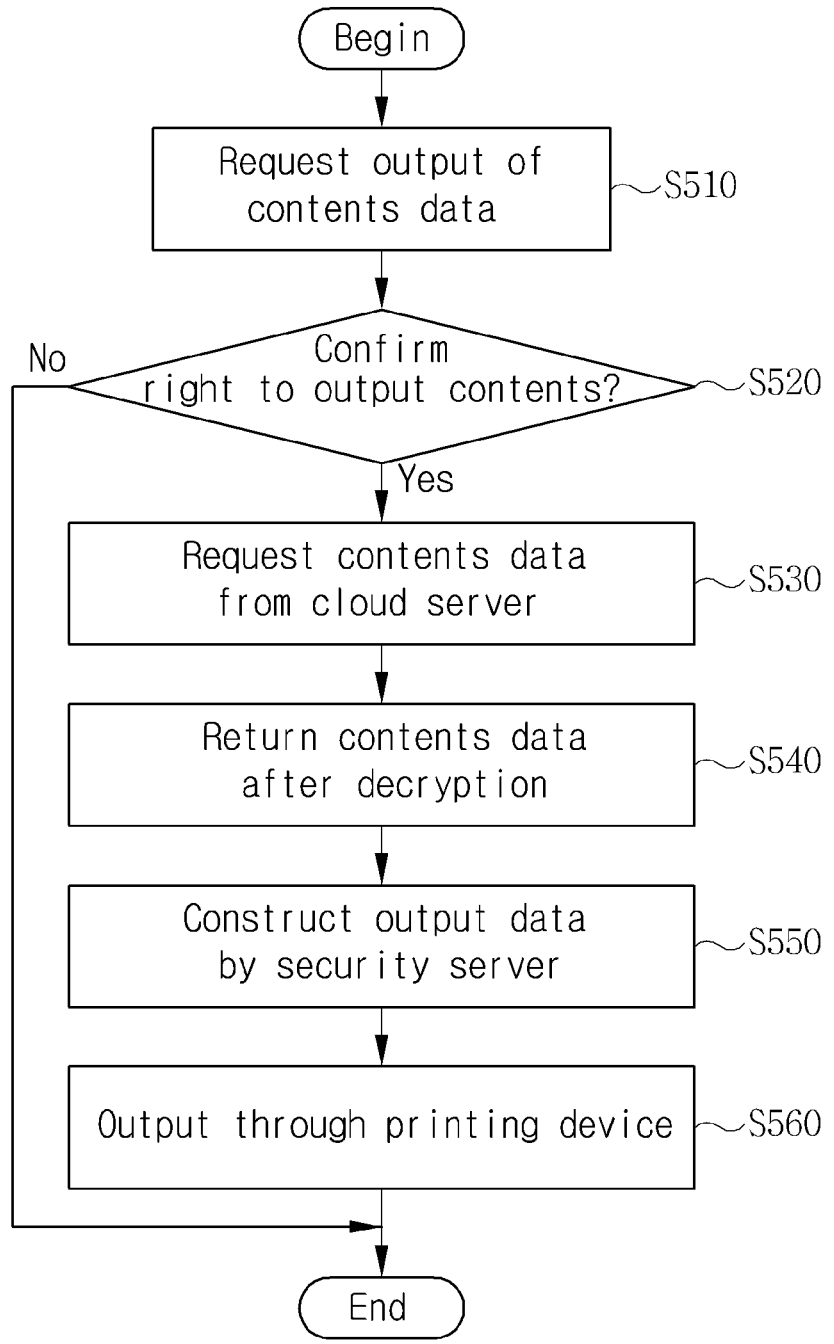
FIG. 5 is a flowchart illustrating a procedure of outputting a contents data in response to a request of a client according to the present invention.

FIG. 5 is a flowchart illustrating a procedure of outputting a contents data in response to a request of a client according to the present invention.

As shown in FIG. 5, when a request for outputting a contents data is received from the client 100 S510, the virtual machine system 200 transmits a variety of identification information of the client 100 such as an ID, an IP address, location information, a MAC address, cookies and the like to the security system 300, together with information on the request, and the security system 300 identifies the client 100 based on the transferred information and determines whether or not to approve the request by confirming whether or not the client 100 has a right for outputting the corresponding contents data S520. If the request is approved by confirming the right for outputting the contents data, the security system 300 requests the contents data from the cloud system 400 S530. If the cloud system 400 decrypts and returns a corresponding contents data S540, the security system 300 receives the contents data and constructs an output data by inserting information on the corresponding DRM, the output date, the output client and the like in the form of a barcode or a watermark S550. The created output data is output through a printing device that is directly controlled by the security server 330, or the created output data is transmitted to the client 100 and output through a printing device connected to the client S560. When the contents data is printed through the client 100, it is preferable to limit the output of the contents data to a predetermined number of times.

Figure 6:
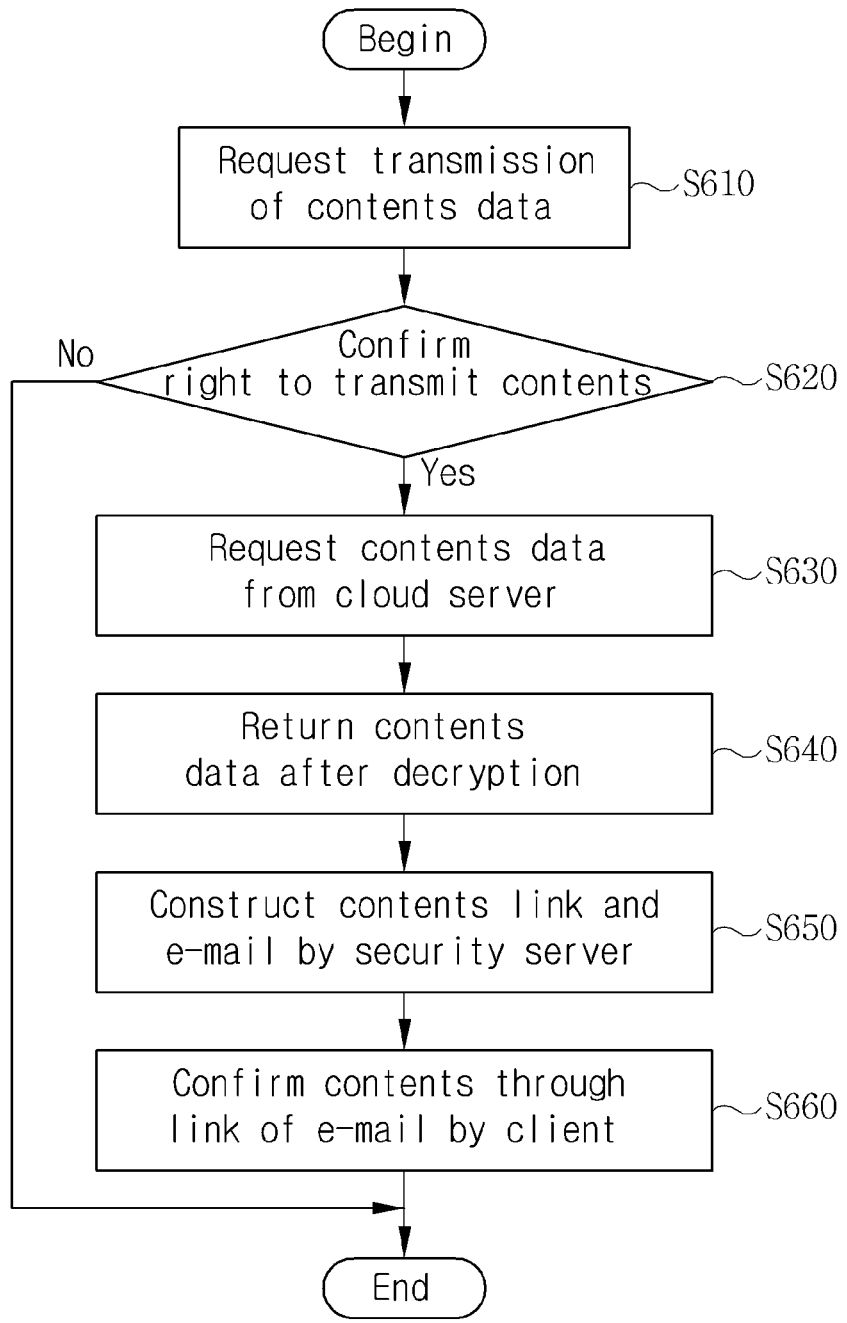
FIG. 6 is a flowchart illustrating a procedure of providing a contents data to outside in response to a request of a client according to the present invention.

FIG. 6 is a flowchart illustrating a procedure of providing a contents data to outside in response to a request of a client according to the present invention.

Although the procedure of confirming whether or not the client 100 has a proper right and receiving a contents data from the cloud server 400, performed by the security system 300 in response to the request of the client 100, is similar to that of a request for viewing or outputting a general contents data, thereafter, the security server 330 constructs an e-mail in a form capable of confirming details of the corresponding contents data through a link to the contents data after authenticating the client as shown in FIG. 6 S650. The security server 330 transmits the constructed e-mail to a destination address, and the client 100 confirms the contents data through the link of the e-mail S660. At this point, it is preferable to allow the client 100 to confirm the contents data as many as a predetermined number of times through the corresponding link after performing a certain process of confirming the client 100 using a password or a certificate.

The element systems and specific servers configuring the cloud E-DRM system according to the present invention are functional elements for performing the functions described above, and depending on an implementation method, the element systems and specific servers may be implemented in an independent or combined form within the system or may be implemented in a plurality of independent systems communicating with one another through a network, and this is not limited to a specific form.

Since the cloud E-DRM system and a service method thereof according to the present invention use a cloud environment of a centralized control scheme, they can be used in a variety of environments without being affected by a use environment such as an OS of a user PC, a terminal type, a software environment or the like. In addition, since a program using the Active-X or the like is not installed in a user terminal, the present invention is implemented so as not to provide the factors threatening security and not to give a bad effect to the user terminal by minimizing collision with the other programs. In addition, the present invention may provide a unified user interface in a variety of environments by configuring the E-DRM solution as a cloud. In addition, the present invention may improve management efficiency and strengthen competitiveness through centralized management and has excellent security functions since data is not stored in the client.

The cloud E-DRM system and a service method thereof according to the present invention are not restricted by the embodiments but only by the appended claims. It is to be appreciated that those skilled in the art can change or modify the embodiments without departing from the scope and spirit of the present invention.

What is claimed is:

1. A cloud enterprise digital rights management system, E-DRM, system comprising:
   a cloud system in which an E-DRM solution is installed, for encrypting and storing a contents data or decrypting and providing the contents data if it is called;
   a security system having access right information of a client, for confirming whether or not the client requesting the contents data has a proper right and requesting the contents data from the cloud system; and
   a virtual machine system for receiving a request for the contents data from the client and transfers the request to the security system, and receiving the contents data from the security system and displaying the received contents data so that the client may view the contents data,
   wherein the virtual machine system includes:
   a virtual server having a screen display function; and
   a device-type-specific server, wherein if the device-type-specific server receives a request for the contents data from the client, the virtual server transfers the request for the contents data to the security system, receives a result of the request and provides the device-type-specific server with a result screen.

2. The system according to claim 1, wherein the cloud system includes:
a cloud server in which the E-DRM solution is installed;
an encryption and decryption server for encrypting and decrypting the contents data; a digital rights management, DRM, storage device for storing DRM data.

3. The system according to claim 1, wherein the cloud system is configured of a plurality of systems, and encrypts, decrypts and stores the contents data in a parallel distributed method.

4. The system according to claim 1, wherein the security system includes:
an authentication server for authenticating the client; and
a policy server having access right information of the client and policy information for the contents data.

5. The system according to claim 1, wherein the security system further includes a security server for creating an output data including at least one or more of the contents data, the output request client and an output date in the contents data in a form of a barcode or a watermark, in response to a request of the client for outputting the contents data.

6. The system according to claim 1, wherein the security system further includes a security server for creating an electronic mail, e-mail, including a link to the contents data, in response to a request of the client for providing the contents data to outside of a network.

7. The system according to claim 1, wherein the contents data returned to the virtual machine system from the cloud system or the security system is a copy of the contents data.

8. The system according to claim 1, wherein when update of the contents data is requested, the contents data is updated after making an agreement on the contents data with a contents distributor or creator.

9. A cloud enterprise digital rights management system, E-DRM, service method comprising:
a data request reception step of receiving a request for a contents data from a client and transferring information on the client and the request for the contents data to a security system, by a virtual machine system;
a right confirmation step of confirming whether or not the client has a proper right on the contents data, by the security system;
a data request step of requesting the contents data from the cloud server, by the security system, if it is determined that the client has a proper right;
a contents return step of finding the contents data from a storage device, encrypting the contents data and returning the contents data to the security system or the virtual machine system, by the cloud server;
an image configuration step of configuring an image using the returned contents data, by the virtual machine system; and
a client response step of providing the client with the configured image, by the virtual machine system,
wherein the virtual machine system includes:
a virtual server having a screen display function and
a device-type-specific server,
wherein if the device-type-specific server receives a request for the contents data from the client, the virtual server transfers the request for the contents data to the security system, receives a result of the request and provides the device-type-specific server with a result screen.

10. The method according to claim 9, wherein at the contents return step, the contents data returned to the virtual machine system is a copy data, not an original data.

11. A cloud enterprise digital rights management system, E-DRM, service method comprising:
a data output request reception step of receiving a request for outputting a contents data from a client and transferring information on the client and the request for outputting the contents data to a security system, by a virtual machine system;
a right confirmation step of confirming whether or not the client has a proper right for outputting the contents data, by the security system;
a data request step of requesting the contents data from the cloud server, by the security system, if it is determined that the client has a proper right;
a contents return step of finding the contents data from a storage device, encrypting the contents data and returning the contents data to the security system, by the cloud server;
an output data configuration step of configuring an output data including at least one or more of the contents data, the output request client and an output date in the returned contents data in a form of a barcode or a watermark, by the security system; and
an output step of outputting the configured output data through a printing device, wherein the virtual machine system includes:
a virtual server having a screen display function and
a device-type-specific server,
wherein if the device-type-specific server receives a request for the contents data from the client, the virtual server transfers the request for the contents data to the security system, receives a result of the request and provides the device-type-specific server with a result screen.

12. A cloud enterprise digital rights management system, E-DRM, service method comprising:
a data provide request reception step of receiving a request for providing a contents data to outside of a network from a client and transferring information on the client and the request for providing the contents data to outside of the network to a security system, by a virtual machine system;
a right confirmation step of confirming whether or not the client has a proper right for providing the contents data to outside, by the security system;
a data request step of requesting the contents data from the cloud server, by the security system, if it is determined that the client has a proper right;
a contents return step of finding the contents data from a storage device, encrypting the contents data and returning the contents data to the security system, by the cloud server;
an electronic mail, e-mail, creation step of creating an e-mail including a link to the returned contents data, by the security system; and
an e-mail transmission and confirmation step of transmitting the created e-mail to the client or an address of a destination requested by the client and confirming the contents data using the link included in the e-mail,
wherein the virtual machine system includes: a virtual server having a screen display function: and a device-type-specific server, wherein if the device-type-specific server receives a request for the contents data from the client, the virtual server transfers the request for the contents data to the security system, receives a result of the request and provides the device-type-specific server with a result screen.

* * * * *